ized Nov. 16, 1954

2,694,719

METHOD OF STABILIZING ASCORBIC ACID WITH ALKALI - THIOSULFATE - CARBAMIDE - COMPLEXES

Jan Opplt, Prague-Nusle, Czechoslovakia

No Drawing. Application February 12, 1949, Serial No. 76,195

8 Claims. (Cl. 260—343.7)

The chemical character itself of the l-ascorbic acid (vitamin C) having the constitution

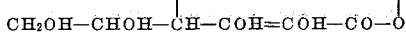

$$CH_2OH-CHOH-CH-COH=COH-CO-O$$

shows that this acid is unstable and reactive. The ascorbic acid is a compound similar to the simple sugars with six carbon atoms and is characterized by a lactonic nucleus and an endiol group COH=COH which latter accounts for the easy oxidation and lability when the ascorbic acid is subjected to heat. The instability of the ascorbic acid is due both to oxidation (auto-oxidation) and to its spontaneous decomposition which latter takes place also in the absence of air, these processes being greatly accelerated at increased temperatures.

Ascorbic acid may be found in various natural and artificial products in solid or liquid condition. In all those products the ascorbic acid is very unstable when they are treated or stored in the usual way. In order to keep the ascorbic acid content constant, or substantially so, it is necessary to stabilize the same by the addition of certain substances — stabilizers. Ascorbic acid is present in natural products, such as fruit, vegetables, meat, and in artificial products, such as medicaments, in solid form (granules, dragées, pills) and in liquid form (fruit juices, pulps, injection liquors). For hygienic and economic reasons it is of importance that the ascorbic acid content in the products just referred to should vary or decrease as little as possible, this requirement being particularly important in connection with medicaments.

If for instance a compote is prepared without a stabilizer in the usual way, that is by boiling for thirty minutes in the presence of air, and if the product is stored in glass containers for some months, the ascorbic acid content will be reduced to a small fraction of its original value, in certain cases practically to zero, which means a considerable loss of the vitamin C so necessary for the human health.

Hitherto both inorganic and organic substances have been proposed as stabilizers for the ascorbic acid. Among the inorganic stabilizers mainly a mixture of sulphur dioxide and carbon dioxide has been used, such mixture being operative to displace the air from a given medium and, by the sulphur dioxide passing into solution, to form a reducing medium which for a time protects the ascorbic acid against oxidation. However, this method cannot be used at elevated temperatures and still less at the boiling point because the dissolved gases are forced out of the solution by the boiling process.

The same stabilizing effect on the ascorbic acid solutions is exerted by sodium bicarbonate NaHCO3 which is decomposed in slightly acid medium and thus forms carbon dioxide which forces the air out of the solution and its vicinity, whereby the ascorbic acid is protected against oxidation.

Meta-phosphoric acid HPO3 in a 10 per cent solution has been also proposed as it has a favorable effect on the stability of vitamin C. However, in this concentration the meta-phosphoric acid cannot be used practically.

Amongst the organic substances various substances containing sulphur combined more particularly in the form of the sulphhydryl group —SH and substances containing the cyanic group —CN have been proposed as stabilizers for the ascorbic acid. Amongst the sulphur containing bodies, the most suitable stabilizers are the mercaptans, glutathione and methionine, and relatively very good results are obtained with cysteine and cystine which are products obtained by the splitting of albumens. Amongst the sulphur containing bodies also the glucose dimethyl mercaptal is known as stabilizer. The ascorbic acid is stabilized also by the cyanides and iso-cyanides which, however, are not suitable due to their highly poisonous nature.

The stabilization may be effected also by means of the recently proposed sulphur derivatives of sugars (thiosugars), which may be used in admixture with other substances, but the process of producing them cannot be carried out without considerable difficulty.

The substances hitherto known and proposed as stabilizers for the vitamin C are not of great value either in the food industry or in the production of medicaments. Some of the stabilizers are directly poisonous, others are more or less harmful to the human health if they are used repeatedly, still others are not easily accessible from the standpoint of manufacture and are expensive. For the above reasons the substances referred to are not suitable for wide application in the food industry and in the pharmaceutical production.

In accordance with the present invention, the soluble salts of the thiosulphuric acids (thiosulphates) are used as stabilizers for the vitamin C. For this purpose either the salt, such as sodium thiosulphate, alone may be used or still better a soluble compound of the latter in conjunction with certain non-poisonous organic substances capable of forming with the thiosulphate complexes which in an acid medium and under heat have a better stability than the thiosulphate itself. A thiosulphate may be used in a neutral medium, or a slightly acid or alkaline medium with a pH-value of 6 to 8 and at relatively low temperatures. However, the thiosulphates alone do not give satisfactory results as stabilizers in the case of a prolonged boiling, in a medium of higher acidity having a pH-value lower than 6, in the case of ageing for some months with access of light at ordinary temperature and finally in the presence of oxidation catalysts such as iron and copper.

The amount of thiosulphate required for stabilization may vary between 1 per cent and 200 per cent, calculated on the amount of the ascorbic acid present, and depends also on the concentration of the ascorbic acid in the solution. As a rule, for the stabilization of diluted solutions a relatively larger proportion of thiosulphate is required.

It is broadly known that with a more pronounced acidity of the medium having a pH-value lower than 5, and more particularly at higher temperatures, decomposition of the thiosulphate takes place with separation of sulphur and sulphur dioxide. It has been found that in order to prevent such decomposition, or at least to slow it down, the thiosulphates may be used in the form of complex compounds with organic substances.

It has been found that as a suitable component of a complex with the thiosulphate, carbamide (urea) may be used either alone or in conjunction with a hexose, such as glucose or fructose. The combination of the carbamide with the hexose may be carried out either as a complex compound or as a chemical compound (ureide), by uniting the amidic group of the ureide to the carbonyl group of the hexose.

Thus for instance the complex of sodium thiosulphate with the carbamide has the formula

NH2CONH2.Na2S2O3.nH2O the complex of the thiosulphate with carbamide and a hexose (glucose) has the formula

COH(CHOH)4CH2OH.NH2CONH2.Na2S2O3.3H2O and the complex of the thiosulphate with glucose ureide has the formula

CH2OH(CHOH)4CH:NCONH2.Na2S2O3.3H2O

The complexes have a better stability than the simple thiosulphates in an acid medium and under heat, and their stability increases with their molecular weight. The thiosulphate complexes containing a hexose, especially those combined in the form of a ureide, are still more stable than the complexes with urea only. The decomposition of such a complex proceeds much slower and the complex is capable of resisting without damage to more acidic media and a longer period of boiling.

The complex thiosulphate compounds with hexose ureide are so stable that they do not decompose in an acid medium, if its pH-value is at least 4, even after the expiration of several months. Small amounts of oxidation catalysts, such as iron and copper present in natural products (vegetables) do not impair the efficiency of the complex stabilizers.

The thiocarbamide $NH_2CSNH_2$ as a component of thiosulphate complexes has the same effect in the stabilization of ascorbic acid but it is not free from objections when used in food products.

All those complex compounds are hygroscopic bodies, they contain different and variable amounts of crystallization water, are readily soluble in water and have no specific taste. The materials referred to are physiologically quite harmless, do not alter in any way the physiological value of the vitamin C and in the human body they become split into their components.

The amount of complex compounds of thiosulphates required for the stabilization is again 1 percent to 100 percent of the ascorbic acid present. The more dilute the solutions of ascorbic acid are, the greater is the required relative proportion of stabilizer.

The stabilizers are excellent for use in the production of fruit juices and compotes, in the treatment of vegetables, in the production of medicaments, injection liquors, etc. where the product is subjected to an elevated temperature for a relatively long time (during sterilization, granulation etc.). In products containing complex stabilizers, the ascorbic acid content is retained substantially without loss even after a 30 minutes boiling, or when air is caused to bubble through the same during 48 hours at ordinary temperature, or after a 6 month storage. If the product is boiled for a longer time (4 to 5 hours), or air is caused to bubble through the same under heating, the ascorbic acid content is reduced only slightly in the presence of complex stabilizers, in the average by 10 to 30 percent. In contrast thereto, under the same conditions but without the addition of stabilizers the ascorbic acid in the products is almost entirely lost.

As compared with the stabilizers hitherto used the new stabilizers have the advantage of being easily accessible, relatively inexpensive and economic. For practical use in the food and pharmaceutic industries the most suitable are the complex compounds formed by the thiosulphates and the sugar ureides because in acid solutions and at elevated temperatures they are relatitvely very stable and moreover are efficient and economical in use.

Other admixtures required for the final preparation of the product may be added to the stabilizers, such additions comprising e. g. preserving agents against moulds and bacteria (benzoic acid), pH-regulators (to adjust the pH-value within the range of between 4.0 and 7.0 a suitable mixture of sodium pyrophosphate and citric acid has given good results), and sugar, starch, pectin in making boiled fruit products.

The efficiency of some stabilizers under various conditions is reported in the following table. For comparing the efficiency of the stabilizers in all cases a solution containing 0.25 g. of ascorbic acid in one liter of distilled water was used, the pH-value of the solution being 4.8. The numbers in the table show the percentage of the original ascorbic acid content left in the solution after completion of the respective operations.

Example I

To prepare an injection liquor, 1000 grams of the sodium salt of l-ascorbic acid were dissolved in 10 liters of re-distilled water, the hydrogen ion concentration adjusted to pH=6.8—7.0 by an addition of free ascorbic acid or of sodium bicarbonate and then 10.0 grams of sodium thiosulphate were added "for analysis." After complete solution of the components and filtration, the solution was filled in ampules each containing 5 ccm., sterilized for 5 hours at 60° C. and then the ampules were sealed.

By analysis of the injection solution after normal storage for 6 months no reduction of the vitamin C content was found, while after 12 months this was reduced to 88 percent of its original value.

Example II

To produce lemon juice, 30 kilograms of lemon pulp containing 0.07 percent of ascorbic acid were incorporated with 50 kilograms of a 40 percent saccharose solution. 80 grams of benzoic acid were added as a preserving medium and 10 grams of the complex compound glucosoureide-sodium thiosulphate

$NH_2CON:CH(CHOH)_4CH_2OH.Na_2S_2O_3.3H_2O$ as a stabilizer and the juice was boiled for 15 minutes. By the boiling the vitamin C content fell to 97 percent of its original value, while in a test sample without stabilizer the vitamin C content fell to 60–65 percent of the original value.

After a 3 month ageing the vitamin C content in the juice was reduced to 85 percent and after a 6 month ageing to 80 percent of the original, while in similar samples without stabilizer the vitamin C content was reduced under the same conditions to about 40 percent and 30 percent, respectively.

Example III

To 100 liters of a pharmaceutical syrup which if desired contains any other medicinal or nutritious components, there are added for vitaminization 30 grams of synthetic l-ascorbic acid and 10 grams of the complex compound glucoso-carbamide-sodium thiosulphate

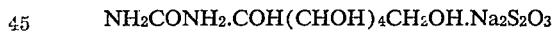

$NH_2CONH_2.COH(CHOH)_4CH_2OH.Na_2S_2O_3$ $3H_2O$ as a stabilizer. The hydrogen ion concentration is adjusted as required by means of pH-regulators to a value of 5.0 to 7.0. In the present case it is most suitable to keep the pH-value at 5.0, this being achieved by means of a suitable mixture of citric acid and sodium pyrophosphate. The mixture is then agitated at normal or elevated temperature and may be boiled for a short time to cause all the components of the syrup to become dissolved.

By tests with the vitamin syrup thus prepared it was ascertained that, when normally stored for one year, the vitamin C content remained unaltered. Some samples of the syrup were subjected to further tests on stability under the effect of light and higher summer temperatures of about 30° C., while stored in unstoppered vessels. Air was bubbled through samples and in all cases it was found that the vitamin C content remained constant.

Example IV

To prepare a rose-bud syrup there is made use of 100 kilograms of crushed and stoned rose-buds containing about 0.6–0.8 gram of ascorbic acid in 1 kilogram of

| Stabilizer | Amount, grams | Boil | | Air bubbling at— | | Oxygen bubbling, 20° C., 2 hr. | Normal ageing in light at 20° C. for 4 months |
|---|---|---|---|---|---|---|---|
| | | 1 hr. | 4 hr. | 20° C., 6 hr. | 80° C., 3 hr. | | |
| (1) Without stabilization | 0 | 5 | 0 | 0 | 0 | 0 | 0 |
| (2) Sodium thiosulphate | 0.3 | 51 | 32 | 68 | 12 | 49 | 27 |
| (3) Fructosoureidesodium thiosulphate | 0.1 | 97 | 76 | 100 | 69 | 78 | 80 |
| (4) Glucosoureidesodium thiosulphate | 0.1 | 98 | 73 | 100 | 68 | 78 | 76 |
| (5) Glucosothioureidesodium thiosulphate | 0.1 | 100 | 84 | 100 | 74 | 80 | 69 |
| (6) Carbamide-sodium thiosulphate | 0.1 | 76 | 65 | 89 | 37 | 54 | 73 |
| (7) Thiocarbamidesodium thiosulphate | 0.1 | 89 | 72 | 98 | 45 | 69 | 77 | buds, and there are added 200 liters of water and 40 grams of the complex compound carbamide-sodium thiosulphate $NH_2CONH_2.Na_2S_2O_3.nH_2O$ as a stabilizer. The mixture is boiled in enamelled kettles for two hours, the boiled product is allowed to settle and then is decanted. If necessary it is diluted with water and is filtered through a fabric. After settling, sugar and medicinal components are added, the syrup is homogenized and then is filled into bottles.

The just described method of treating permits to retain, even after a 6 month storage of the syrup, 80 to 90 percent of the original ascorbic acid content of the rosehips. This content is not appreciably varied by further storage and by dilution of the syrup with water or other diluents. In absence of the stabilizer, with the same method of treatment and the same period of storage, the vitamin C content in the rose-hip syrup will fall to only 20 percent of the original value.

*Example V*

To prepare an apricot marmalade or jam at home there is made use of 5 kilograms of cleaned apricots cut to pieces and having an ascorbic acid content up to 0.15 gram per 1 kilogram of fruit and there are added 5 liters of a 50 percent sugar solution and 10 grams of benzoic acid as a preserving agent. In a first test 0.5 gram of the complex compound fructoso-ureide-sodium thiosulphate $$NH_2CON:C-CH_2OH(CHOH)_3CH_2OH,Na_2S_2O_3.nH_2O$$

were used as a stabilizer, while in a second test 0.5 gram of the complex compound carbamide-sodium thiosulphate $NH_2CONH_2.Na_2S_2O_3.nH_2O$ were used. The mixture was boiled for 30 minutes with agitation from time to time and after cooling the product was filled into glass containers.

By analysis it was found that the fresh product a short time after its preparation contained 88 percent of the original vitamin C content, when the first stabilizer was used, and 80 percent of the original vitamin C content, when the second stabilizer was used, while under the same conditions, but without the addition of a stabilizer, the vitamin C content fell down to 25 percent of the original value. After a 5 month storage, the vitamin C content in the product containing the first stabilizer fell to 65 percent and in the product containing the second stabilizer to 60 percent, while without the addition of a stabilizer the vitamin C content was as low as 10 percent of the original value.

What I claim is:

1. A method of stabilizing ascorbic acid present in media having a pH value of less than 7.0 comprising the addition, in a proportion equivalent to at least 1% of the ascorbic acid content, of a stabilizer having as main constituent a water-soluble substance selected as to all its components from the group consisting of an alkali-thiosulphate-carbamide-complex compound and of hexosic derivatives of the said complex compound.

2. A method of stabilizing ascorbic acid as claimed in claim 1, wherein the stabilizer consists solely of a water-soluble alkali-thiosulphate-carbamide-complex compound of the formula $NH_2CONH_2.Na_2S_2O_3.H_2O$.

3. A method of stabilizing ascorbic acid as claimed in claim 1, comprising the addition of a stabilizer having as main constituent a water-soluble alkali-thiosulphate-carbamide-hexose-complex compound of the formula $C_6H_{12}O_6.NH_2CONH_2.Na_2S_2O_3.3H_2O$.

4. A method of stabilizing ascorbic acid as claimed in claim 1, comprising the addition of a stabilizer having as main constituent a water-soluble alkali-thiosulphate-hexose-ureide-complex compound of the formula $$CH_2OH(CHOH)_4CH:NCONH_2.Na_2S_2O_3.3H_2O$$

5. Ascorbic acid present in media having a pH value of less than 7.0 stabilized with a water-soluble substance selected as to all its components from the group consisting of an alkali-thiosulphate-carbamide-complex compound and of hexosic derivatives of the said complex compounds in a quantity corresponding to at least 1% of the ascorbic acid content.

6. Ascorbic acid present in media having a pH value of less than 7.0 stabilized solely with a water-soluble alkali-thiosulphate-carbamide-complex compound of the formula $NH_2CONH_2.Na_2S_2O_3.H_2O$ in a quantity corresponding to at least 1% of the ascorbic acid content.

7. Ascorbic acid present in media having a pH value of less than 7.0 stabilized with a quantity corresponding to at least 1% of the ascorbic acid content of a water-soluble alkali-thiosulphate-carbamide-hexose-complex compound of the formula $$C_6H_{12}O_6.NH_2CONH_2.Na_2S_2O_3.3H_2O$$

8. Ascorbic acid present in media having a pH value of less than 7.0, stabilized with a quantity corresponding to at least 1% of the ascorbic acid content of a water-soluble alkali-thiosulphate-hexose-ureide-complex compound of the formula $$CH_2OH(CHOH)_4CH:NCONH_2.Na_2S_2O_3.3H_2O$$

References Cited in the file of this patent

UNITED STATES PATENTS

| Number | Name | Date |
|---|---|---|
| 1,583,002 | Metz | May 4, 1926 |
| 2,116,640 | Quehl | May 10, 1938 |
| 2,187,467 | Stuart | Jan. 16, 1940 |
| 2,297,212 | Gockel | Sept. 29, 1942 |
| 2,298,933 | Elion | Oct. 13, 1942 |
| 2,312,195 | Ruskin | Feb. 23, 1943 |
| 2,322,493 | Wilson | June 22, 1943 |

OTHER REFERENCES

Kawerau et al.: Proc. Dublin. Soc. Scientific, 1942–44, v. 23, page 174.